L. L. WHITNEY.
ADJUSTABLE BRAKE HEAD.
APPLICATION FILED JULY 19, 1917.
1,323,342.
Patented Dec. 2, 1919.
2 SHEETS—SHEET 1.
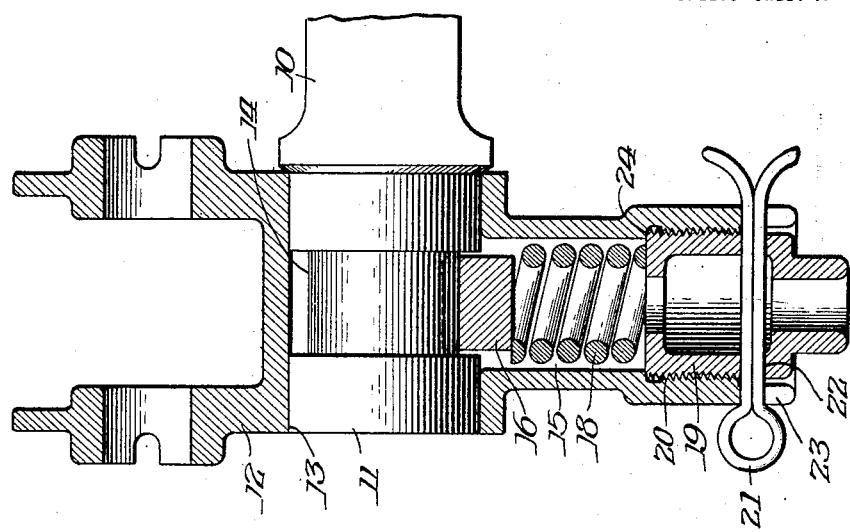
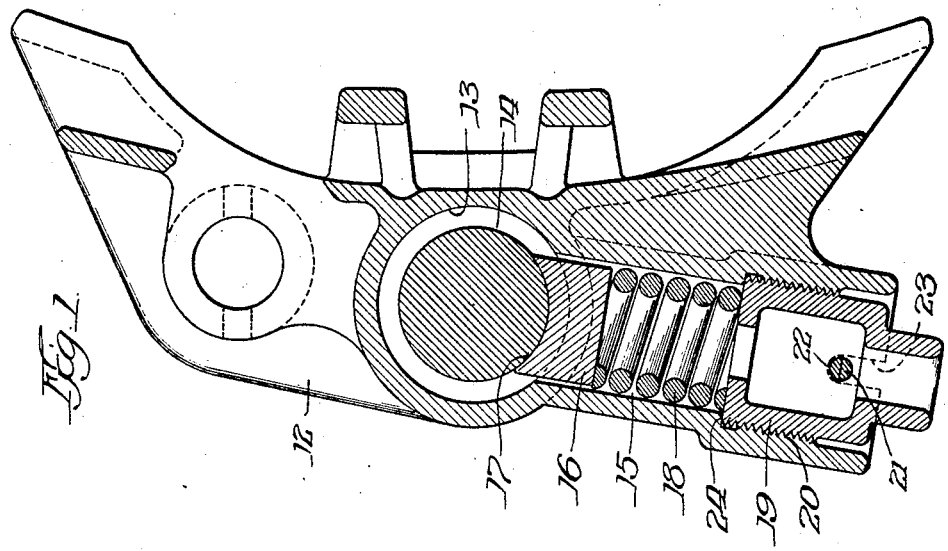
Witnesses:
Inventor
Loren L. Whitney
By Wilkinson + Huxley
Attys L. L. WHITNEY.
ADJUSTABLE BRAKE HEAD.
APPLICATION FILED JULY 19, 1917.
1,323,342.
Patented Dec. 2, 1919.
2 SHEETS—SHEET 2.
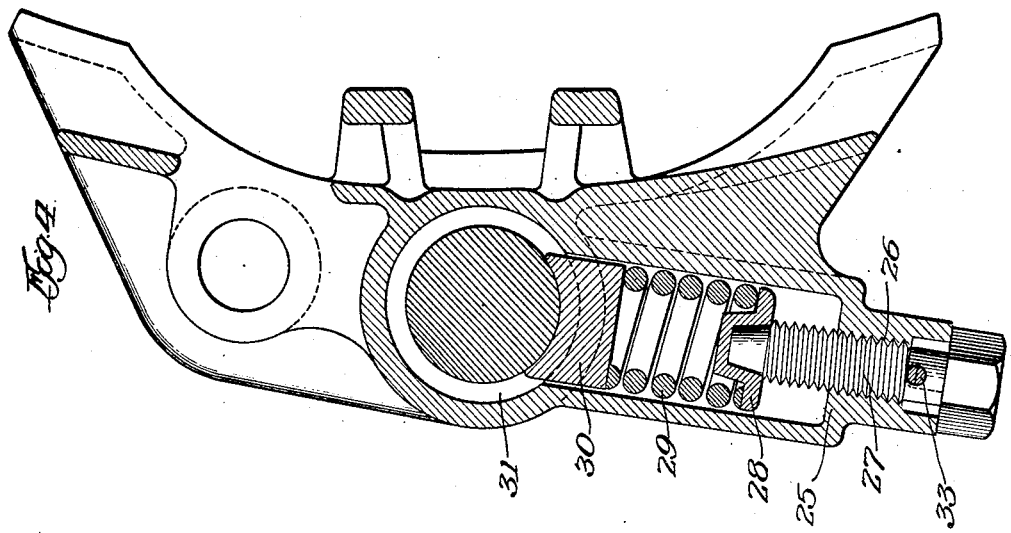
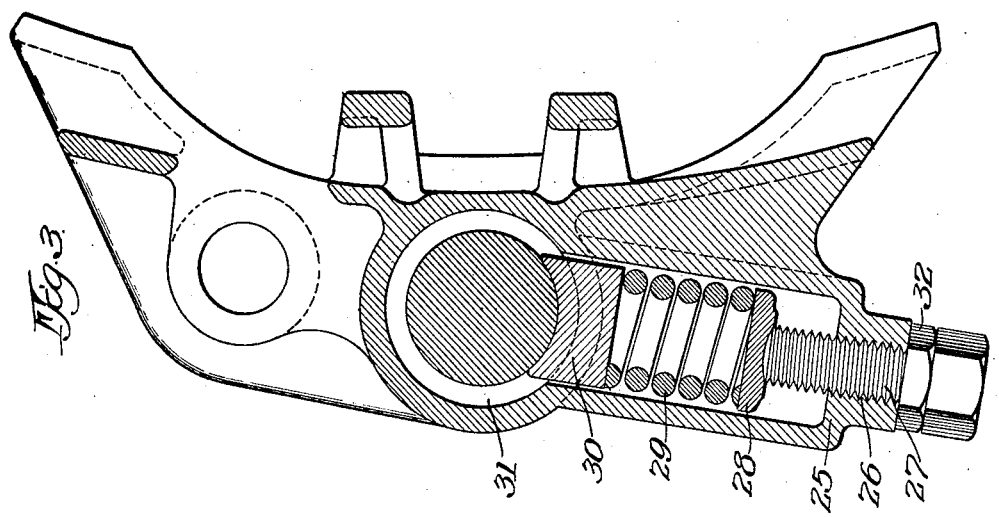
Witnesses:
Inventor
Loren L. Whitney
By Wilkinson & Huxley
Attys.

UNITED STATES PATENT OFFICE.

LOREN L. WHITNEY, OF HAMMOND, INDIANA, ASSIGNOR TO AMERICAN STEEL FOUNDRIES, OF CHICAGO, ILLINOIS, A CORPORATION OF NEW JERSEY.

ADJUSTABLE BRAKE-HEAD.

1,323,342.  Specification of Letters Patent.  Patented Dec. 2, 1919.

Application filed July 19, 1917. Serial No. 181,484.

*To all whom it may concern:*

Be it known that I, LOREN L. WHITNEY, a citizen of the United States, and resident of Hammond, in the county of Lake and State of Indiana, have invented certain new and useful Improvements in Adjustable Brake-Heads, of which the following is a specification.

This invention relates primarily to the railway art, and more particularly to adjustable brake heads.

One of the objects of this invention is to improve the manner of adjustably mounting brake heads on beams to obtain more efficient results.

Another object is to provide a novel brake head adapted to meet the various requirements for successful commercial operation.

These and other objects are accomplished by providing a brake head including a body portion with an opening for the reception of a beam trunnion, and adjustably mounted means for frictionally holding the head with respect to the beam.

The invention is illustrated on the accompanying sheets of drawings in which,

Figure 1 is a longitudinal sectional view of a brake head embodying my invention;

Fig. 2 is another sectional view of the same brake head taken at right angles to the section shown in Fig. 1, and Figs. 3 and 4 are longitudinal sectional views of brake heads embodying modifications of my invention.

The various novel features will be apparent from the following description and drawings and will be particularly pointed out in the appended claim.

There are many advantages in having brake heads adjustably mounted upon the trunnions of a brake beam, chief among these advantages being that the beam may be hung in relation to the wheel at any desired or suitable distance from the rail and at the same time allow the brake shoe to be concentric with the wheel. With this arrangement the brake head, after being applied at any suitable location and at the desired angle with the brake beam, is maintained in that position and at the same time permits of an automatic adjustment so that if there is any change in the relation of the brake beam and the wheel, the brake head and its shoe will automatically be adjusted to concentricity with the wheel whenever the brakes are applied.

By referring first to Figs. 1 and 2 of the drawings, it will be noted that I have shown a brake beam 10 having a cylindrical trunnion 11 upon which my novel brake head 12 is adjustably mounted, the cylindrical trunnion being received in the cylindrical opening 13 in the body of the brake head 12. The trunnion 11 of the brake beam has a circumferential groove 14 formed therein.

In the lower part of the brake head an opening or pocket 15 extends from the bottom of the brake head to and registers with the transverse cylindrical opening 13 of the brake head. This cylindrical pocket 15, which is at right angles to the opening 13, incases among other things a bearing block 16, the curved surface 17 of which bears against the surface of the circumferential groove 14 in the brake beam trunnion. The bearing block 16 is normally pressed with a relatively great force and held in engagement with the groove 14 of the beam trunnion by a resilient member or coiled spring 18, one end of which engages the lower portion of the bearing block and the other end of which is backed by a screw plug 19 having threaded engagement with an internal threaded portion 20 of the cylindrical wall of the pocket 15. The plug may be screwed into the pocket any desirable amount to compress the spring 18 a corresponding amount and thereby vary the pressure of bearing block against the groove in the trunnion to vary the frictional engagement between the bearing block 16 and the grooved portion of the trunnion. When the plug, which also acts as a closure to the pocket, has been screwed into the pocket the desired amount, the same may be locked therein by inserting a cotter pin 21 through registering openings 22 in the plug and openings 23 in the lower end of the cylindrical wall of the pocket.

As shown in Figs. 1 and 2, the plug 19 is inserted to the maximum amount, the plug engaging an annular stop shoulder 24 in the pocket. The spring 18 is correspondingly compressed substantially a maximum amount so that the spring is working at its compressed height to exert its maximum effect to frictionally maintain the brake head and beam trunnion in a given relation with respect to each other.

If, however, during brake application there is any shifting in the relative location of the brake beam and the wheel, the friction between the block 16 and the trunnion will be overcome and the brake head will be automatically shifted to a different angular position for maintaining the brake shoe concentric with the wheel.

It will be noted that the bearing block 16 fitting between the shoulders formed by the groove 14 in the trunnion also retains the brake head in its longitudinal position on the trunnion and prevents the head working off the trunnion.

In assembling the parts, a bearing block 16 is dropped into the pocket 15 and is allowed to fall away so that the brake head may be slipped upon the trunnion 11. In view of the fact that the block has been permitted to fall down out of the way, it does not yet engage the groove 14 in the trunnion. After the brake head is mounted on the trunnion of the beam, the spring 18 is inserted through the bottom of the pocket 15 and pushed up against the block 16. The plug 19 is then inserted in the bottom of the pocket and screwed up compressing the spring 18 and thus forcing the block 16 into engagement with the groove 14 of the trunnion. By the time the plug 19 has been screwed up against the shoulder 24 in the pocket, the spring 18 has been compressed almost solid and under such conditions exerts considerable force against the block 16 resulting in frictional holding effect between the block 16 and the brake beam trunnion. After the plug 19 has been screwed into place the cotter pin 21 is inserted, as above indicated, to prevent the plug from backing out of the pocket. When the device is thus assembled the same is ready for operation.

In Figs. 3 and 4 I have shown modifications of my invention which in principle are the same as the one shown in Figs. 1 and 2, with the exception of a variation in the threaded portion of the bottom of the head and consequently a slight change in the method of assembling.

In these modifications the bottom of the pocket 25 is closed except for a threaded opening 26 for a set screw 27. A spring cap 28 is inserted between the bottom of the spring 29 and the set screw 27 to provide a bearing for the spring. In every other respect the functions of the various parts and their arrangements are the same as in the form shown in Figs. 1 and 2. In assembling the arrangement shown in Figs. 3 and 4 the spring seat or cap 28, spring 29 and bearing block 30 are inserted in the pocket 25 through the trunnion opening of the brake head in the order named. This is all done before the brake head is slipped onto the brake beam trunnion. Sufficient depth is provided in the pocket 25 so that with the spring unloaded and at its free height, the bearing block 30 may drop far enough into the pocket to allow the brake head to be slipped over the trunnion. After the head is mounted on the trunnion, the set screw 27 is inserted and screwed up through the opening in the bottom of the pocket. Engaging with the spring cap 28 the set screw upon being screwed up further compresses the spring 29, lifting the bearing block 30 into engagement with the groove 31 in the brake beam trunnion. In the same manner as in the form of invention first described, the spring is compressed to such a point that its resilience holds the bearing block in tight engagement with the groove in the trunnion. The set screw may be locked in place with a lock nut 32, as shown in Fig. 3, or with a cotter pin 33, as shown in Fig. 4. After the set screw has been tightened into place and the lock nut jammed or the cotter pin inserted the whole device is ready for use.

By means of the arrangement herein described it will be noted that the spring works comparatively close to its compressed height and therefore the available resilience and travel of the spring is relatively great. It is necessary that the spring be worked comparatively close to its compressed height for otherwise the arrangement would be comparatively ineffective, or in other words, the full value would not be obtained from the spring and consequently there would be considerable loss in the frictional holding effect between the block and the trunnion.

It is evident that there may be modifications of the invention other than those herein particularly shown and described, and it is my intention to cover all such modifications which do not involve a departure from the spirit and scope of the invention as set forth in the following claim.

I claim:

A brake head including a body portion having an opening for the reception of a brake beam trunnion, an opening registering with said first mentioned opening, a block in the second opening engageable with the trunnion, a spring acting upon said block, and a threaded member for closing the second opening and for varying the force with which said block engages the trunnion.

Signed at Hammond, Indiana, this 9" day of July, 1917.

LOREN L. WHITNEY.

Witnesses:
 Wm. C. Leimbach,
 J. M. Ebert.